Figure 1:
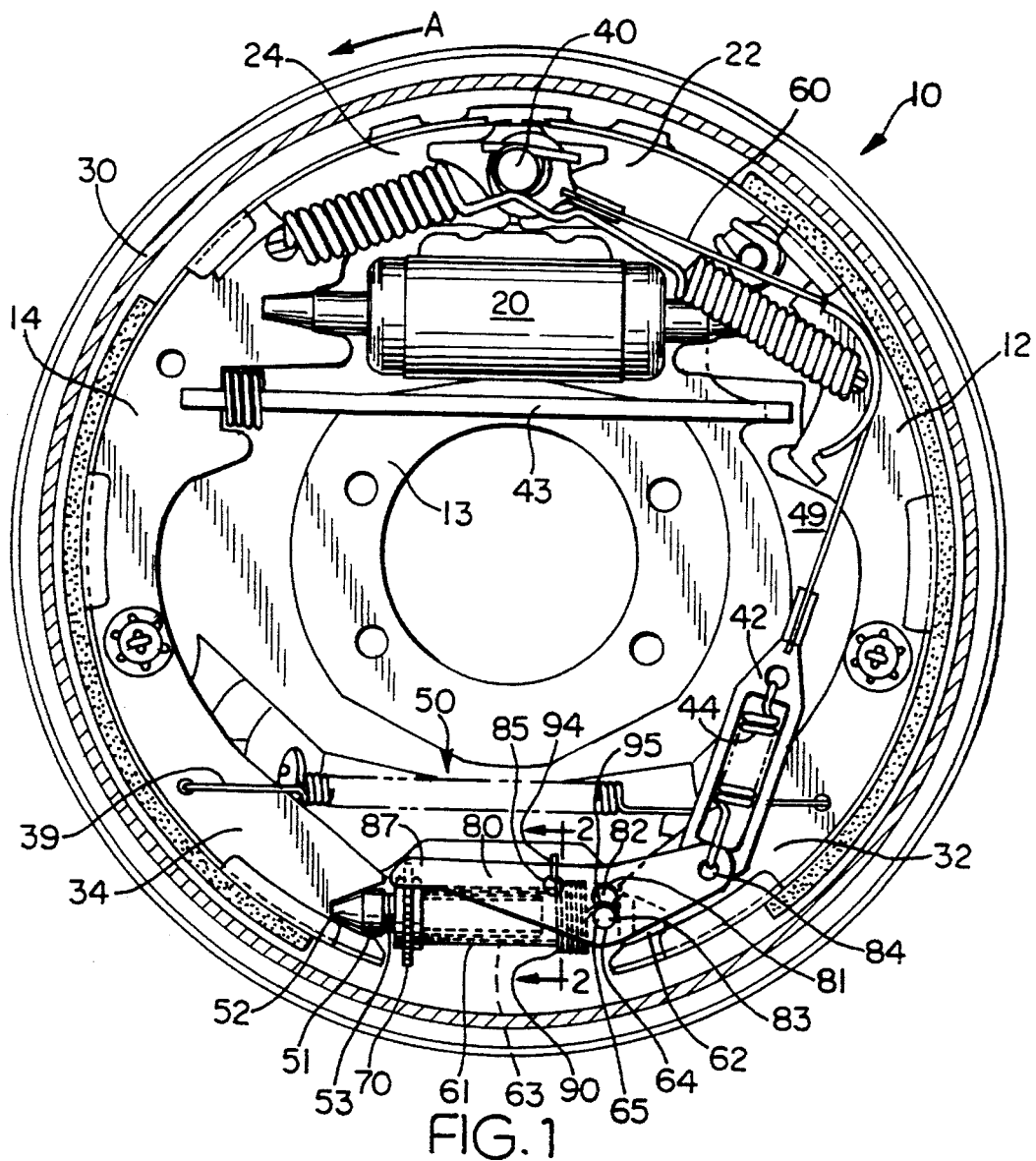

United States Patent [19]
Johannesen

[11] Patent Number: 5,480,010
[45] Date of Patent: Jan. 2, 1996

[54] DRUM BRAKE ADJUSTER

[75] Inventor: Donald D. Johannesen, South Bend, Ind.

[73] Assignee: AlliedSignal Inc., Morristown, N.J.

[21] Appl. No.: 330,298

[22] Filed: Oct. 27, 1994

[51] Int. Cl.$^6$ .................................................. F16D 65/56
[52] U.S. Cl. ........................ 188/79.54; 188/79.56; 188/196 BA; 188/196 F; 188/331
[58] Field of Search ................. 188/196 BA, 196 F, 188/331, 79.51, 79.54, 79.56, 79.63, 106 F, 79.57, 79.58, 79.59, 79.61, 329, 79.64

[56] References Cited

U.S. PATENT DOCUMENTS

| | | | |
|---|---|---|---|
| 2,107,092 | 2/1938 | Swennes. | |
| 2,140,385 | 12/1938 | Hunt et al.. | |
| 2,232,308 | 2/1941 | Berglund. | |
| 2,280,784 | 4/1942 | Berno. | |
| 3,184,008 | 5/1965 | Winge et al. | 188/79.56 |
| 3,540,555 | 11/1970 | Bolenbaugh | 188/79.56 |
| 3,583,532 | 6/1971 | Hodkinson | 188/196 BA |
| 4,101,011 | 7/1978 | Burnett | 188/196 BA |
| 4,139,083 | 2/1979 | Hoshino et al. | 188/196 BA |
| 4,276,966 | 7/1981 | Ayers | 188/196 BA |
| 4,573,557 | 3/1986 | Shellhause | 188/331 |
| 5,042,623 | 8/1991 | Yamamoto. | |
| 5,085,296 | 2/1992 | Carr et al. | 188/196 BA |
| 5,193,653 | 3/1993 | Carr | 188/196 BA |
| 5,377,793 | 1/1995 | Livingston et al. | 188/331 |

FOREIGN PATENT DOCUMENTS 689348  4/1965  Italy.

*Primary Examiner*—Douglas C. Butler
*Attorney, Agent, or Firm*—Larry J. Palguta; Leo H. McCormick, Jr.

[57] ABSTRACT

A duo-servo drum brake (10) includes an application adjuster mechanism (50). The application adjuster mechanism (50) comprises a threaded member (51) anchored to one brake shoe end (34), a socket member (61) anchored to the other brake shoe end (32), an opening (63) in the socket member (61) which freely receives a threaded shaft (53) of the threaded member (51), a starwheel (70) rotatedly mounted on the threaded member (51) and abutting an adjacent end (65) of the socket member (61), the socket member (61) having an axially extending button (64) and a torsion spring (90) disposed about its outer surface, the torsion spring having a hook end (95)engaging the button (64). A cable mechanism (60) has one end connected to the anchor pin (40) of the duo-servo drum brake (10) and the other end has a spring member (44) connected with a lever (80) of the adjuster mechanism (50). The lever (80) has a figure-eight shaped opening (81) receiving the button (64) so that the lever (80) is rotatably mounted thereto, with an end part (87) engaging the starwheel (70) and an opposite end having an opening (84) receiving the spring member (44). The lever (80) includes another opening (85) which receives an end (94) of the torsion spring (90).

5 Claims, 1 Drawing Sheet

DRUM BRAKE ADJUSTER

The present invention relates generally to a drum brake having an adjuster mechanism, and in particular to a duo-servo drum brake having an application adjuster mechanism.

Many drum brakes have been provided adjuster mechanisms that effect adjustment of the drum brake shoes relative to the drum as the brake shoe linings wear. Winge et al U.S. Pat. No. 3,184,008 discloses a non-servo drum brake having an adjuster mechanism with the lever pivotally mounted to an anchor block, or the lever mechanism pivotally mounted to a brake shoe web. Other servo-brakes have had levers mounted to fixed members of the drum brake, such as in U.S. Pat. Nos. 3,279,565; 3,326,331; and 4,645,040 or mounted to the shoe web such as in Haggerty et al U.S. Pat. No. 3,216,533, and other non-servo brakes have had adjuster lever mechanisms attached to the shoe web such as in Haggerty U.S. Pat. No. 3,473,633. It is highly desirable to provide an adjuster mechanism for a duo-servo drum brake wherein the adjuster mechanism has most of its parts, if not all of its parts, contained within a singular, modular type of assembly, as opposed to being located on other adjacent parts of the drum brake. It is desirable that the structure of the adjuster mechanism be simplified, such as eliminating threads produced by drill tapping. It is also highly desirable to have the parts on the adjuster mechanism moved away from the center of the drum brake in order to allow more room for anti-lock braking system tone wheels or large bolt patterns. It is desirable that a spring mechanism typically used to return a lever of the adjuster mechanism be simplified so that corresponding inspection requirements are reduced or simplified.

The present invention provides solutions to the above by providing a drum brake with an adjuster mechanism, the drum brake comprising a pair of brake shoes having between one pair of opposed ends said adjuster mechanism, the adjuster mechanism comprising a threaded shaft member engaging non-rotatably one of said ends of the drum brake shoes, a socket member engaging non-rotatably the other end of the other brake shoe, a starwheel received threadedly on said shaft and the threaded shaft extending into the socket member such that the starwheel engages an end of said socket member, the socket member having a projection extending from one side thereof, a lever member mounted rotatably on said projection and including an end part engaging said starwheel, resilient means located at said socket member and having one end extending into engagement with said lever member, and connection means extending from a stationary portion of said drum brake to a connection with an opposite end of said lever member, such that during braking movement of said brake shoes away from one another can cause said end part to rotate said starwheel to extend longitudinally said threaded shaft relative to the socket and effect adjustment of the shoes relative to a drum of the brake.

Figure 2:
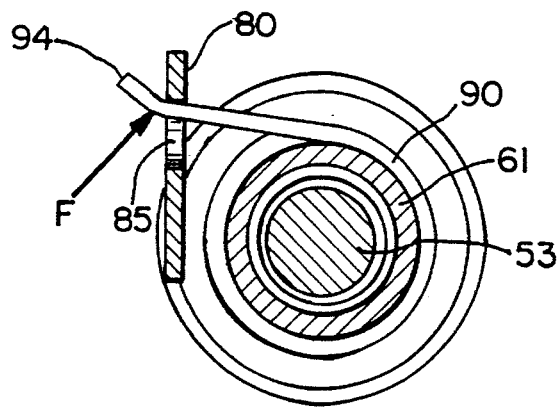

One way of carrying out the invention is described in detail below with reference to the drawings which illustrate an embodiment in which:

FIG. 1 is a view of a duo-servo drum brake having the adjuster mechanism of the present invention; and FIG. 2 is a section view take along view line 2—2 of FIG. 1.

Referring to FIG. 1, a duo-servo drum brake is indicated generally by reference numeral 10. Drum brake 10 includes drum brake shoes 12 and 14 located on a backing plate 13. Shoes 12 and 14 may be expanded outwardly by wheel cylinder 20 to engage a drum 30. Duo-servo drum brake 10 includes an anchor pin 40 abutted by a first pair of opposed brake shoe ends 22 and 24, while a second pair of opposed brake shoe ends 32 and 34 are separated by an adjuster mechanism referenced generally by numeral 50. A cable or connecting means 60 is attached at one end to the anchor pin 40 while another end includes a bracket member 42 receiving a spring Member 44 which is attached to the adjuster mechanism 50. Shoes 12 and 14 are biased toward one another by return spring 39 and a strut 43 engages at one end the shoe 14 and at the other end a parking brake lever 49.

The adjuster mechanism 50 comprises a threaded member 51 which includes an end 52 that engages non-rotatably (via a not shown slot end) the end 34 of brake shoe 14, and a threaded shaft 53. A socket member 61 includes an end 62 having a slot received non-rotatably at the shoe end 32 of brake shoe 12. Socket 61 includes an opening 63 receiving freely the threaded shaft 53. A projection, button or pivot pin 64 extends axially, relative to the drum brake, from the socket member 61. A starwheel 70 includes a threaded central opening (not shown) which receives threadedly the threaded shaft 53 such that starwheel 70 abuts the end 65 of socket member 61. A lever 80 includes a generally figure-eight shaped opening 81 comprising an enlarged portion 82 extending to a smaller portion 83 which receives the pivot pin 64. Pivot pin 64 includes an enlarged head 65 so that lever 80 will not move axially or disengage from pin 64 once the smaller portion of the opening 83 is received around a reduced diameter portion of the pin 64. Lever 80 includes an end opening 84 which receives an end of the spring or resilient member 44 connected with cable 60, and another opening 85 located along its longitudinal axis which receives an end 94 of a torsion spring 90. Lever 80 further includes an end part 87 which engages a star wheel 70. Torsion spring 90 is mounted around the socket member 61 and has an end 95 shaped as a hook so that it fixedly engages the pivot pin 64. As illustrated in FIG. 2, end 94 of torsion spring 90 extends through the opening 85 of lever 80 such that when lever 80 is rotated about pivot pin 64 the end part 87 moves downwardly relative to the starwheel 70 and effects rotation thereof while being biased upwardly by torsion spring 90.

In operation, as the brakes of the vehicle are applied the brake shoes 12 and 14 are displaced outwardly by wheel cylinder 20 to engage the drum 30 which is rotating in the direction of arrow A in FIG. 1. Upon reverse braking, and if the shoe linings have worn enough to require adjustment, the brake shoes move outwardly to cause the cable (which is connected slidably with shoe 12) to move upwardly relative to lever 80 and cause the lever to pivot about pivot pin 64 so that end part 87 is moved downwardly in the direction of arrow B and against starwheel 70 which is rotated. As starwheel 70 is rotated, it advances along threaded shaft 53 so that threaded member 51 is displaced away from socket member 60 to move brake shoe ends 32, 34 slightly away from one another. This adjustment of the brake shoes 12 and 14 will bring them closer to the drum as the brake shoe linings experience wear.

The drum brake and adjuster mechanism of present invention provide several advantages over prior drum brakes and adjuster mechanisms. The socket member 61 does not require a threaded or tapped opening, and is merely drilled out as a smooth opening via a cross drill operation which is faster than a blind tap. Because pivot pin 64 is formed on socket member 61, virtually all of the parts of the adjuster assembly 50 are located between the shoe ends 32 and 34. Lever 80 is connected to cable 60 to effect actuation thereof, but otherwise the remaining portion of the parts are more modularized so that they are located on the adjuster mechanism rather than on adjacent structure such as the drum brake shoes, anchor blocks, and so on. Another significant advantage is that adjusting cable 60 is located further from the center of the drum brake and this allows more room for anti-lock braking system tone wheels or large bolt patterns. Additionally, the torsion spring 90 provides a lever return spring so that when braking is terminated, the lever 80 is returned to the illustrated at-rest position, and is a much simpler torsion spring as opposed to previous torsion springs having complex side and torsion load definitions which require dual inspection requirements. Torsion spring 90 provides inherently a suitable starwheel side load because of the direction of the load vector shown as "F" in FIG. 2. Thus, the side loading force F keeps the lever end part 87 in engagement with starwheel 70.

I claim:

1. A drum brake with an adjuster mechanism, the drum brake comprising a pair of brake shoes having between one pair of opposed ends said adjuster mechanism, the adjuster mechanism comprising a threaded shaft member engaging non-rotatably one of said ends of the drum brake shoes, a socket member engaging non-rotatably the other end of the other brake shoe, a starwheel received threadedly on said shaft and the threaded shaft extending into the socket member such that the starwheel engages an end of said socket member, the socket member having a projection extending from one side thereof and said projection comprising a button having an enlarged head and a reduced diameter area, a lever member mounted rotatably on said button and including an end part engaging said starwheel and an opposite end extending away from the end part, resilient means comprising a torsion spring mounted around said socket member and having one end extending into engagement with said lever member and another end fixedly engaging said button, and connection means comprising a cable attached at a first end to an anchor pin of the drum brake and a second end which includes a resilient member connected with the opposite end of the lever member, such that braking movement of said brake shoes can cause the connection means to pivot said lever about the button so said end part of the lever member causes rotation of said starwheel, which extends longitudinally said threaded shaft relative to the socket member and effects adjustment of the brake shoes relative to a drum of the drum brake.

2. The drum brake in accordance with claim 1, wherein said lever member includes a generally figure-eight shaped hole with one portion large enough to be received over the enlarged head of said button and a second portion received at the reduced diameter area of said button.

3. The drum brake in accordance with claim 2, wherein said lever member includes an opening which receives said one end of the torsion spring.

4. The drum brake in accordance with claim 3, wherein the opposite end of the lever member includes an opening which receives the resilient member.

5. The drum brake in accordance with claim 1, wherein the drum brake comprises a duo-servo drum brake with each of the shoes engaging an anchor pin at a second pair of opposed ends of the shoes.

* * * * *